3,242,156
PROCESS FOR THE PREPARATION OF CIS-1,4-POLYBUTADIENE
Walter Marconi and Alessandro Beranger, Milan, and Marcello de Maldé, San Donato Milanese, Italy, assignors to SNAM-Societa per Azioni
No Drawing. Filed Apr. 13, 1962, Ser. No. 187,190
Claims priority, application Italy, Apr. 20, 1961, Patent 655,555
4 Claims. (Cl. 260—94.3)

This invention relates to the production of a stereospecific polymer of butadiene.

Stereospecific polymers of butadiene, particularly cis-1,4-polybutadiene, are of considerable industrial interest.

Various catalytic systems have been proposed for use in producing this polymer; in particular the preparation of cis-1,4-polybutadiene has been described using a binary catalyst consisting of titanium tetraiodide and an aluminum trialkyl.

It is an object of the present invention to provide a novel catalyst system for obtaining cis-1,4-polybutadiene.

This catalyst has the advantage over those hitherto known that it does not contain any constituents spontaneously inflammable in air, such as the aluminium organic compounds.

According to the present invention there is provided a process for the production of homopolymer of butadiene in which the 1,4-cis isomer predominates, which comprises polymerizing monomeric butadiene under substantially anhydrous conditions and in the presence of a catalyst obtained from (a) titanium tri- or tetra-chloride, (b) a complex hydride of aluminium and (c) iodine.

By using this catalyst poly-butadiene is obtained in good yields as a solid polymer of high molecular weights and having a high percentage of the cis-1,4 structure in the solid polymer, the proportion exceeding 90%.

The molar ratio between the elements titanium and iodine expressed as Ti to $I_2$ in the catalyst, is preferably between 1:1 and 20:1, most preferably between 4:1 and 10:1. Similarly the ratio between the elements aluminum and iodine, expressed as Al to $I_2$ is preferably between 1:1 and 10:1, most preferably between 1.5:1 and 4.1.

The effect of variation in these ratios upon the percentage of cis-1,4-polybutadiene with respect to the solid polymer, upon the one hand, and upon the yield of solid polymer and the rate of conversion on the other hand, may be expressed as follows:

An increase of the Al to $I_2$ ratio causes an increase in the yield of polymer and an increase of its content of 1,4-cis units.

The molecular weights of the polymers determined from their viscosity may vary from 50,000 to 700,000.

The polymerization is preferably carried out in an aromatic hydrocarbon as a solvent medium, such as toluene, at ordinary pressure.

The components of the catalysts may be introduced, separately, direct into the polymerization vessel or the catalyst may be prepared separately, by mixing the components, the order of succession in which they are added being immaterial, and maintaining them at a raised temperature, usually between 50 and 90° C. and preferably between 60 and 70° C. for 5–10 minutes. At this stage, when the titanium halide is the tetrachloride, the formation of a finely divided, solid, black compound is observed.

The titanium tetrachloride and the iodine, which are soluble in the solvent media, may be introduced in solution; the titanium trichloride and the complex aluminium hydride are insoluble in the solvent media and are introduced in the solid state.

From the polymerization the polymer is obtained as a viscous solution which is freed from solvent in the usual manner.

The term "yield" of solid polymer as used herein means the quantity of solid polymer obtained per 100 g. of monomer butadiene fed.

The invention will be more fully understood from the following examples.

EXAMPLES 1–7

1,3-butadiene is polymerized with the aid of a catalyst system comprising lithium aluminium hydride, iodine and titanium trichloride.

The lithium aluminium hydride was obtained in the pure state by extraction with ether of the commercial compound and subsequent evaporation of the ether.

Into a small borosilicate glass flask of 150 ml. capacity, provided with two necks and furnished with a magnetic stirrer, which had previously been heated over a free flame and then allowed to cool down whilst passing a stream of nitrogen, there is introduced a predetermined quantity of iodine as a 0.1 M solution in toluene and then the required quantities of lithium aluminium hydride and of titanium trichloride (the order of the succession of addition of these two components being immaterial). The flask is then heated upon an oil bath to 60–80° C. whilst maintaining moderate agitation for 5–10 minutes. At the end of this period there is introduced 100 ml. of anhydrous, deaerated toluene and, while keeping the resulting suspension stirred, the contents of the flask are siphoned into a thoroughly dried drink bottle of 250 ml. capacity through which a stream of nitrogen is passed. The bottle is closed hermetically by means of a metallic corona type cap and a neoprene rubber gasket from which the antioxidant had been removed by repeated extraction with boiling toluene. The metal cap is punched in such a way as to expose a part of the neoprene seal and through this part there is introduced by means of a steel hypodermic syringe a weighted amount of 1,3-butadiene. The bottle is then placed in a bath maintained at constant temperature and in which it is rotated for a predetermined period. At the end of this time, the polymerization is stopped by destroying the catalyst with 2 ml. of isopropyl alcohol. Then 1% of a phenolic antioxidant dissolved in toluene is introduced and the contents discharged into a litre of denaturated methyl alcohol, the whole being vigorously stirred. The resulting coagulated polymer is collected and then dried at 60° C. under vacuum. It is weighed and the yield of polymer and the conversion are then calculated.

The dry polymer is usually completely soluble in toluene and the intrinsic viscosity at 30° C. in solution therein is determined. A part of the polymer, purified by means of re-precipitation from solution in benzene, is dissolved in carbon sulphide for the determination of the infrared spectrum.

In Table 1 are listed a number of polymerizations carried out as above described.

Table 1

LiAlH$_4$-I$_2$-TiCl$_3$

| No. | Ratio in mols, monomer:solvent | LiAlH$_4$:I$_2$:TiCl$_3$ | Temp., °C. | Time, hrs. | Polymer, gr. | Yield, percent | Infrared analysis ||||  Insol. residue, percent |
|---|---|---|---|---|---|---|---|---|---|---|---|
| | | | | | | | Trans | 1,2 | Cis | Total unsatur. | |
| 1 | 1:2.5 | 9:0.5:1 | Room | 39 | 13.82 | 98 | 1.4 | 5.3 | 93.3 | 103 | 2.6 |
| 2 | 1:3 | 8:0.5:1 | 15 | 15 | 20.57 | 100 | 1.6 | 4.7 | 93.7 | 101 | 3.9 |
| 3 | 1:4 | 8:1:1 | Room | 15 | 21.76 | 96 | 4.6 | 5.3 | 90.1 | 100 | |
| 4 | 1:4 | 7:2.8:1 | 14 | 54 | 6.12 | 40 | 5.6 | 5.1 | 80.3 | 102 | |
| 5 | 1:3 | 6:1.3:1 | Room | 24 | 15.56 | 50 | 4.3 | 5.5 | 90.2 | 99 | |
| 6 | 1:4 | 6:1.5:1 | 15 | 30 | 14.63 | 95 | 3.9 | 4.7 | 91.4 | 100 | |
| 7 | 1:4 | 2:0.5:1 | 14 | 64 | 13.65 | 55 | 4.3 | 4.6 | 91.1 | 99 | |

EXAMPLES 8–15

Operation is as described in the preceding examples, but titanium trichloride is replaced by titanium tetrachloride.

The titanium tetrachloride, in 0.2 molar solution in toluene, is added as a third component after the lithium aluminium hydride and the iodine.

The results of a series of polymerization are tabulated in Table 2.

Table 2

LiAlH$_4$-I$_2$-TiCl$_4$

| No. | Ratio in mols, monomer:solvent | LiAlH$_4$, mmols 100 gr. | LAH:I$_2$:TTC | Temp., °C. | Time, hrs. | Polymer, gr. | Yield, percent | Infrared analysis ||||
|---|---|---|---|---|---|---|---|---|---|---|---|
| | | | | | | | | Trans | 1,2 | Cis | Total unsaturation |
| 8 | 1:4 | 17.4 | 1.5:0.5:1 | 2 | 16 | 14.31 | 83 | 6.4 | 4.2 | 88.3 | 97 |
| 9 | 1:4 | 16.6 | 2:0.5:1 | 2 | 16 | 22.6 | 94.5 | 6.0 | 4.3 | 88.7 | 98 |
| 10 | 1:4 | 12 | 2.8:0.5:1 | 4 | 15 | 24.26 | 100 | 2.8 | 4.8 | 92.3 | 104 |
| 11 | 1:8 | 31 | 3:0.5:1 | 2 | 16 | 9.56 | 99 | 3.3 | 4.2 | 92.5 | 98 |
| 12 | 1:6 | 25 | 4:0.5:1 | 5 | 16 | 16.2 | 100 | 2.8 | 4.6 | 92.0 | 101 |
| 13 | 1:5 | 17.2 | 1.5:0.25:1 | 5 | 16 | 16.57 | 95.8 | 2.0 | 4.3 | 93.7 | 97 |
| 14 | 1:7 | 30.5 | 2:0.25:1 | 5 | 16 | 12.0 | 92.2 | 4.1 | 4.5 | 91.3 | 98 |
| 15 | 1:6 | 24 | 2:1:1 | 5 | 16 | 16.26 | 99 | 4.7 | 4.1 | 91.1 | 98 |

We claim:

1. A process for the production of a linear polybutadiene containing at least 88% of the 1,4-cis isomer which consists in
   (a) forming a catalyst by reacting together in an aromatic hydrocarbon at an elevated temperature and under substantially anhydrous conditions
      (1) a titanium chloride selected from the group consisting of titanium trichloride and titanium tetrachloride,
      (2) a hydride of aluminum and an alkali metal which is insoluble in the diluent and is introduced in the solid state, and
      (3) iodine,
   the molar ratio of Ti to I$_2$ being within the range 1:1 to 20:1, and the molar ratio of Al to I$_2$ being within the range 1:1 to 10:1,
   (b) polymerizing monomeric butadiene in the presence of said catalyst, and
   (c) thereafter isolating polybutadiene predominating in the 1,4-cis isomer from the reaction product.

2. A process as claimed in claim 1 in which the ratio of Ti to I$_2$ in said catalyst is within the range 4:1 to 10:1 and the ratio of Al to I$_2$ in said catalyst is within the range 1.5:1 to 4:1.

3. A process for the production of a linear polybutadiene containing at least 88% of the 1,4-cis isomer which consists in
   (a) forming a catalyst by reacting together in an aromatic hydrocarbon, at an elevated temperature and under substantially anhydrous conditions
      (1) titanium tetrachloride,
      (2) lithium aluminum hydride introduced in the solid state, and
      (3) iodine,
   the molar ratio of Ti to I$_2$ in said catalyst being within the range 4:1 to 10:1 and the molar ratio of Al to I$_2$ in said catalyst being within the range 1.5:1 to 4:1,
   (b) polymerizing monomeric butadiene in the presence of said catalyst, and
   (c) thereafter isolating the polybutadiene predominating in the 1,4-cis isomer from the reaction product.

4. A process for the production of a linear polybutadiene containing at least 88% of the 1,4-cis isomer which consists in
   (a) forming a catalyst by reacting together in an aromatic hydrocarbon, at an elevated temperature and under substantially anhydrous conditions
      (1) titanium trichloride
      (2) lithium aluminum hydride introduced in the solid state, and
      (3) iodine,
   the molar ratio of Ti to I$_2$ in said catalyst being within the range 4:1 to 10:1 and the molar ratio of Al to I$_2$ in said catalyst being within the range 1.5:1 to 4:1,
   (b) polymerizing monomeric butadiene in the presence of said catalyst, and
   (c) thereafter isolating the polybutadiene predominating in the 1,4-cis isomer from the reaction product.

References Cited by the Examiner

UNITED STATES PATENTS

| 2,977,349 | 3/1961 | Brockway et al. | 260—94.3 |
| 3,066,129 | 11/1962 | Farrar | 260—94.3 |

FOREIGN PATENTS

| 665,207 | 6/1963 | Canada. |
| 551,851 | 4/1957 | Belgium. |

JOSEPH L. SCHOFER, Primary Examiner.

WILLIAM H. SHORT, Examiner.